US010886974B2

(12) United States Patent
Islam et al.

(10) Patent No.: US 10,886,974 B2
(45) Date of Patent: *Jan. 5, 2021

(54) BODY DETECTION USING NEAR FIELD MILLIMETER WAVE SCATTERING

(71) Applicant: MOTOROLA MOBILITY LLC, Chicago, IL (US)

(72) Inventors: Md Rashidul Islam, Lombard, IL (US); Hugh K. Smith, Palatine, IL (US); Colin D. Frank, Park Ridge, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/533,574

(22) Filed: Aug. 6, 2019

(65) Prior Publication Data

US 2019/0363759 A1     Nov. 28, 2019

Related U.S. Application Data

(63) Continuation of application No. 15/853,385, filed on Dec. 22, 2017, now Pat. No. 10,411,765.

(51) Int. Cl.
*H04B 5/00* (2006.01)
*H04L 5/00* (2006.01)
*H04W 4/80* (2018.01)

(52) U.S. Cl.
CPC ......... *H04B 5/0043* (2013.01); *H04L 5/0048* (2013.01); *H04W 4/80* (2018.02)

(58) Field of Classification Search
CPC .......... H04B 5/0043; H04B 3/38; H04B 3/52; H04B 17/24; H04B 17/309; H04B 5/00; H04B 5/0062; H04W 4/80; H04L 5/0048
See application file for complete search history.

(56) References Cited

U.S. PATENT DOCUMENTS

| 10,411,765 B2 * | 9/2019 | Islam | H04L 5/0048 |
| 2006/0132284 A1 * | 6/2006 | Murphy | G05B 19/042 |
| | | | 340/5.7 |

(Continued)

FOREIGN PATENT DOCUMENTS

WO    WO2007076854    *   1/2007

*Primary Examiner* — Nhan T Le
(74) *Attorney, Agent, or Firm* — Yudell Isidore PLLC

(57) ABSTRACT

A communication device includes a processor subsystem that is in communication with a communication module, which is communicatively coupled to an antenna array to transmit and receive signals. The processor subsystem executes a near-field detection application to perform a method including transmitting, via the antenna array, a signal that is swept across a range of frequencies and receiving any back-scattered signals in the range of frequencies. The method includes determining whether a near-field obstruction exists based on characteristics of the received back-scattered signals. In response to determining that a near-field obstruction exists, the method includes triggering the processor subsystem to perform one or more responsive operations on the communication device. The operations include a selected one of: (i) altering a transmission beam transmitted by the communication device; and (ii) triggering an application to execute on the communication device, the application intended to interact with a user of the communication device.

20 Claims, 9 Drawing Sheets

(56) References Cited

U.S. PATENT DOCUMENTS

2018/0076520 A1* 3/2018 Ma ........................ G01S 13/74
2018/0216389 A1* 8/2018 Tsui ...................... E05F 15/40

* cited by examiner

BODY DETECTION USING NEAR FIELD MILLIMETER WAVE SCATTERING

RELATED APPLICATION

This application is a continuation of U.S. application Ser. No. 15/853,385, filed Dec. 22, 2017, the content of which is fully incorporated herein by reference.

BACKGROUND

1. Technical Field

The present disclosure relates generally to detecting user proximity to a communication device.

2. Description of the Related Art

Generally-known smart phones and other mobile communication devices, or user equipment (UE), in the 5th generation Long Term Evolution (5G LTE) of wireless communications will employ planar antenna arrays in order to have higher directive gains over single antenna or diversity antenna configurations. The higher directive gains are needed to circumvent the increased path loss at millimeter wave (mmWave) frequencies, such as around 28 GHz.

BRIEF DESCRIPTION OF THE DRAWINGS

The description of the illustrative embodiments is to be read in conjunction with the accompanying drawings, wherein.

DETAILED DESCRIPTION

Figure 1:
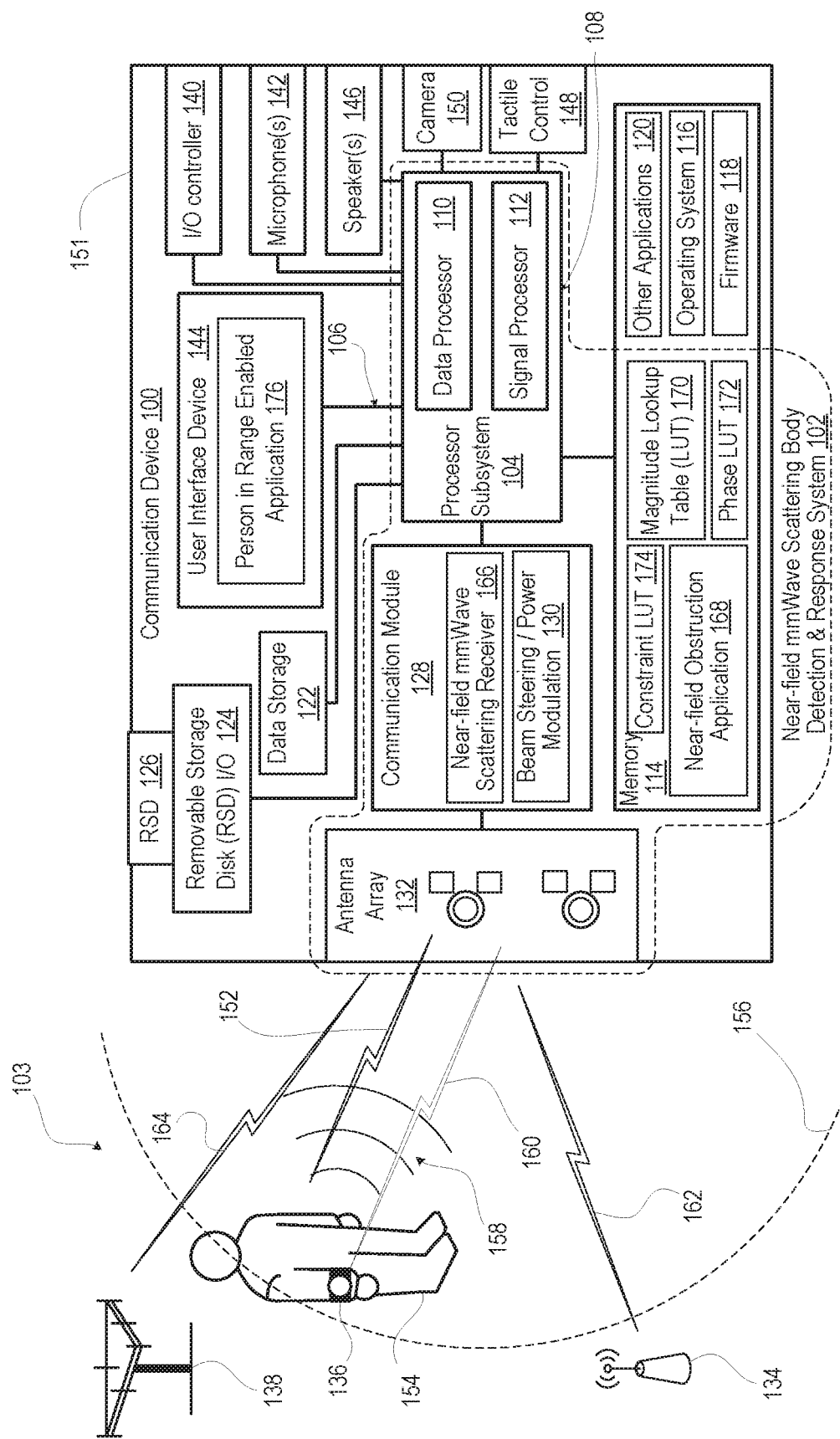
FIG. 1 illustrates a simplified block diagram of a communication device having a near-field scattering body detection and response system with which certain aspects of the disclosure can be practiced, in accordance with one or more embodiments.

According to aspects of the present disclosure, a method is provided for detecting and responding to detection of an object such as a person within a near-field distance to a communication device. In one or more embodiments, the method includes transmitting a millimeter wave (mmWave) signal, swept across a range of frequencies, from the communication device. The communication device receives any back-scattered signals in the range of frequencies. The method includes determining based on magnitude and phase characteristics of the received back-scattered signals, whether a near-field obstruction exists. In response to determining that a near-field obstruction exists, the method includes performing a selected one of: (i) altering a transmission beam transmitted by the communication device; and (ii) triggering an application to execute on the communication device, the application is intended to interact with a user of the communication device.

According to aspects of the present disclosure, a communication device includes a processor subsystem that is in communication with a communication module. The communication module is communicatively coupled to an mmWave antenna array to transmit and receive signals. The processor subsystem executes program code of a near-field detection application. The communication module causes the mmWave antenna array to transmit an mmWave signal that is swept across a range of frequencies. The communication module receives any back-scattered signals in the swept range of frequencies via the mmWave antenna array. The processor subsystem determines whether a near-field obstruction exists based on magnitude and phase characteristics of the received back-scattered signals. In response to determining that a near-field obstruction exists, the processor subsystem performs a selected one of: (i) altering a transmission beam transmitted by the communication device; and (ii) triggering an application to execute on the communication device. The application provides a user interface or other mechanism/affordance that enables a user to interact with the application and/or the communication device.

According to aspects of the present disclosure, a computer program product includes program code on a computer readable storage device that, when executed by a processor associated with a communication device, the program code enables the communication device to provide the functionality of the aforementioned method.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements may be exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

Turning now to FIG. 1, there is depicted a block diagram representation of an example communication device 100 having a body detection and response system 102 that relies on near-field mmWave scattering and within which several of the features of the disclosure can be implemented. In one or more embodiments, communication device 100 incorporates wireless communication capabilities to operate as a wireless communication device. Communication device 100 can be one of a host of different types of devices, including but not limited to, a mobile cellular phone or smart-phone, a laptop, a net-book, an ultra-book, a networked smart watch or networked sports/exercise watch, and/or a tablet computing device or similar device that can include wireless communication functionality. As a device supporting wireless communication, communication device 100 can be one of, and also be referred to as, a system, device, subscriber unit, subscriber station, mobile station (MS), mobile, mobile device, remote station, remote terminal, user terminal, terminal, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. These various devices all provide and/or include the necessary hardware and software to support the various wireless or wired communication functions as part of a communication system 103. Communication device 100 can also be an over-the-air link in communication system 103 that can be intended to be portable or hand-held or for which a user can move into close proximity. Examples of such communication devices include a wireless modem, an access point, a repeater, a wirelessly-enabled kiosk or appliance, a femtocell, a small coverage area node, and a wireless sensor, etc.

Referring now to the specific component makeup and the associated functionality of the presented components, processor subsystem 104 can be an integrated circuit (IC) that connects, via a plurality of bus interconnects 106, to a plurality of functional components 108 of communication device 100. Processor subsystem 104 can include one or more programmable microprocessors, such as data processor 110 and digital signal processor (DSP) 112 of processor subsystem 104, which may both be integrated into a single processing device, in some embodiments. Processor subsystem 104 controls the communication, user interface, and other functions and/or operations of communication device 100. These functions and/or operations thus include, but are not limited to including, application data processing and signal processing. Communication device 100 may use hardware component equivalents such as special purpose hardware, dedicated processors, general purpose computers, microprocessor-based computers, micro-controllers, optical computers, analog computers, dedicated processors and/or dedicated hard wired logic. Connected to processor subsystem 104 is memory 114, which can include volatile memory and/or non-volatile memory. Memory 114 stores software, such as operating system 116, as well as firmware 118. One or more other executable applications 120 can be stored within memory 114 for execution by processor subsystem 104. Memory 114 may be augmented by on-device data storage 122. Also connected to processor subsystem 104 is removable storage device (RSD) input/output (I/O) interface 124 that receives a RSD 126 for additional storage.

According to the illustrative embodiment, communication device 100 supports wireless communication via a communication module 128. Communication module 128 has a beam steering and power modulation component 130 that directs and power modulates a transmission beam at selected frequencies over an antenna array 132. For example, communication device 100 may support communication protocols and transceiver radio frequencies appropriate for a wireless local area network (WLAN), illustrated as node 134. Communication device 100 can communicate over a personal access network (PAN) with devices such as a smart watch 136. Communication device 100 can communicate with a radio access network (RAN) 138 that is part of a wireless wide area network (WWAN). In certain embodiments, communication device 100 may also support a hardwired local access network (LAN) (not shown) or peripheral devices via an I/O controller 140.

Communication device 100 includes input and output devices. For example, microphone 142 receives user audible inputs. User interface device 144 can present visual or tactile outputs as well as receive user inputs. In one example, user interface device 144 can include a touch screen that is embedded within or associated with a display. An audio speaker 146 can augment or provide alternate presentation of the visual or tactile outputs of user interface device 144. A tactile control 148 can provide an interface such as for braille reading or manual inputs. An image capturing device, such as a camera 150, can receive gestures and other image data. Communication device 100 can be wholly or substantially encompassed by an enclosure 151. In one or more embodiments, communication device 100 can be a distributed system of wireless or wired links or a component subsystem incorporated into a larger assembly or system, such as a smart home control system.

Quality of Service (QoS) of wireless communication within communication system 103 is enhanced by directing a substantial portion of the transmission power toward an intended receiver. In some instances, transmission is inadvertently directed in a transmission beam 152 toward a person 154, who can be the user of communication device 100. Transmission beam 152 can be customized for near-field obstruction detection or can be a channel sounding reference signal (SRS) used as part of a communication protocol standard. If person 154 is within a near field distance 156 from antenna array 132, a significant magnitude of back scattered signal 158 can be directed back at antenna array 132. In an exemplary embodiment, near-field distance 156 is approximately 20 cm. Back scattered signal 158 has a phase with respect to transmitted beam 152 that is a function of frequency. Near-field obstruction presented by person 154 can degrade communication performance.

According to one aspect, to mitigate this situation, body detection and response system 102 can alter transmission beam 152. Altering transmission beam 152 can include transmitting a reduced-power transmission beam 160 toward person 154, such as to communicate with smart watch 136. Altering transmission beam 152 can include directing or steering a substantial portion of the transmission power in another direction. For example, transmission beam 162 is directed toward node 134 and transmission beam 164 is directed toward RAN 138 and not person 154. In one or more embodiments, body detection and response system 102 includes a near-field mmWave scattering receiver 166 that detects magnitude and phase of back-scattered signal 158. In an exemplary embodiment, near-field mmWave scattering receiver 166 is a dedicated receive-only receiver for supporting all instances in which communication device 100 is transmitting. Body detection and response system 102 includes a near-field obstruction application 168 that is resident in memory 114. Near-field obstruction application 168 is executed by processor subsystem 104. Near-field obstruction application 168 uses the radio frequency (RF) measurement information from near-field mmWave scattering receiver 166 to determine if an obstruction exists as well as whether the obstruction is likely to be human. The determination can be based on empirical data contained in a magnitude lookup table (LUT) 170 and a phase LUT 172. In response to detecting person 154, communication device 100 can limit power transmitted toward person 154 according to a limit provided by constraint LUT 174.

Rather than being used for altering the transmission beam, detection of a person within a near-field distance can be used for other purposes. In one or more embodiments, near-field obstruction application 168 can respond by triggering person-in-range enabled (PIRE) application 176 that is presented on user interface device 144. PIRE application 176 is intended to interact with a user that is within a near-field distance to interact with communication device 100. For example, PIRE application 176 that unlocks communication device 100 with an audible or visual cue from a user can require that the user be close to communication device 100.

Figure 2:
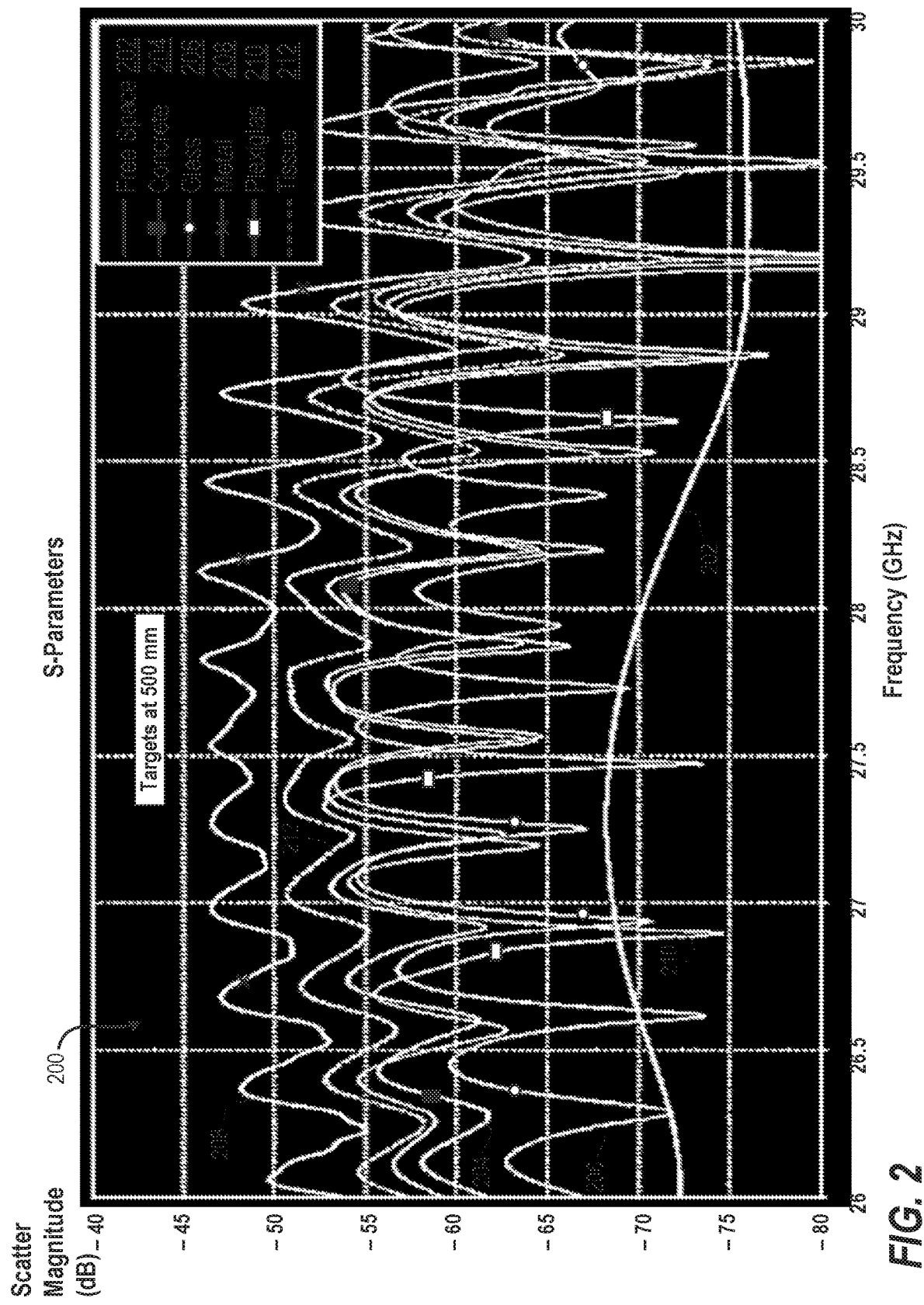
FIG. 2 illustrates a proof-of-concept graphical plot of magnitude traces for back-scattered signals from different types of surfaces, according to one or more embodiments.

FIG. 2 illustrates a proof-of-concept graphical plot 200 of the magnitude traces of back-scattered signals from different types of surfaces at a common distance of 500 mm. Each surface was tested by a swept frequency signal from 26-30 GHz. The different test results plotted include: (i)free space magnitude trace 202; (ii) concrete magnitude trace 204; (iii) glass magnitude trace 206; (iv) metal magnitude trace 208; (v) Plexiglas magnitude trace 210; and (vi) tissue magnitude trace 212. Metal provides the highest magnitude of back scattered energy. Biological tissue 212 provided the second highest magnitude of back scattered energy. Consequently, a magnitude threshold can be set to include returns typical of tissue and metal with returns greater than this being conservatively deemed a human. Thus, magnitude of the back-scattered signal can be used to detect whether the scattering object is a human body for signal quality purposes.

Figure 3:
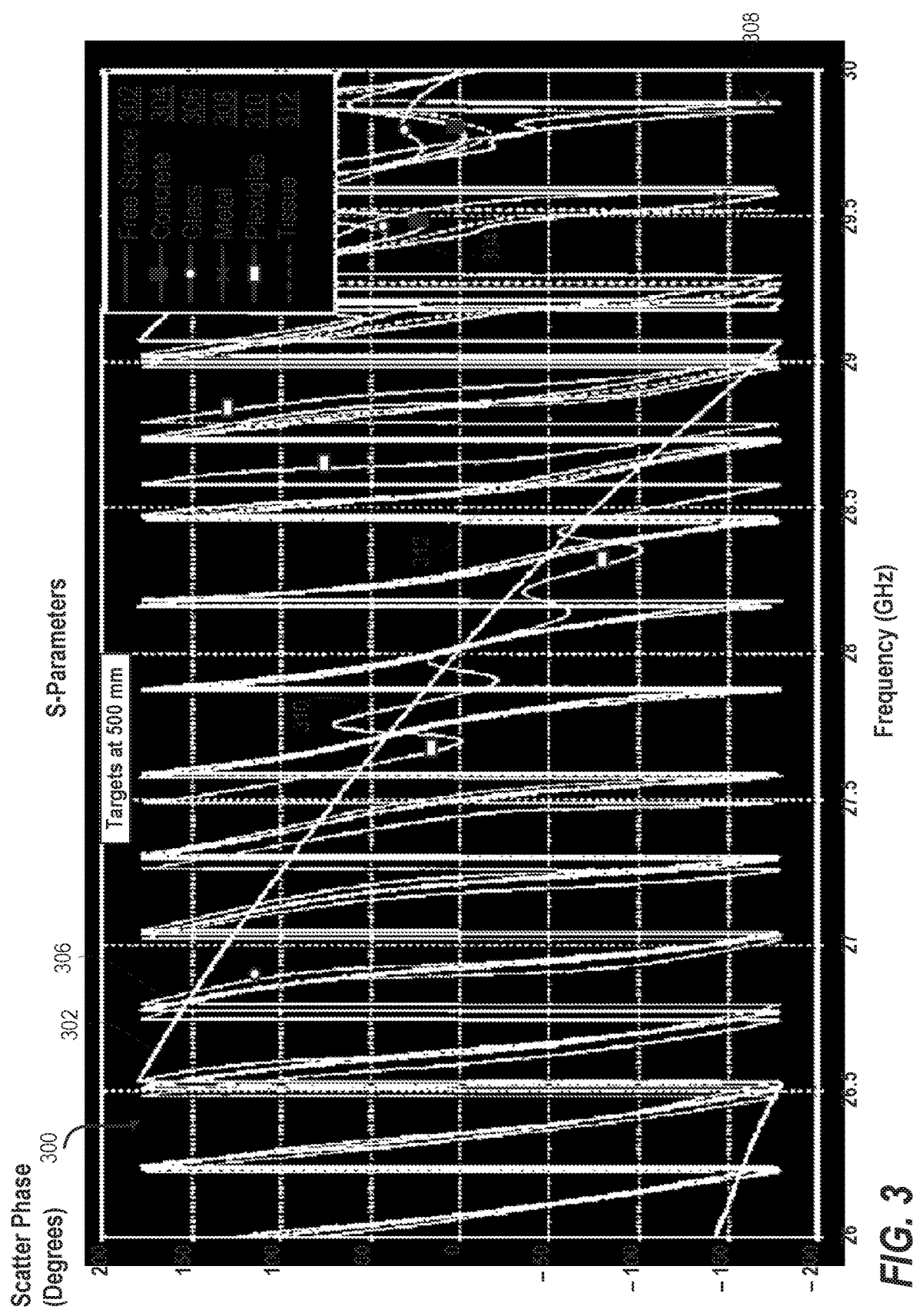
FIG. 3 illustrates a proof-of-concept graphical plot of phase traces for back-scattered signals from different types of surface.

FIG. 3 illustrates a proof-of-concept graphical plot 300 of phase traces that correspond to magnitude traces 202-210 (FIG. 2). The different test results plotted include: free space phase trace 302; concrete phase trace 304; glass phase trace 306; metal phase trace 308; Plexiglas phase trace 310; and tissue phase trace 312. Phase signatures are similar for the various types of surfaces, so phase is not usable for differentiating a human from other types of targets. However, the phase of the back-scattered signal can be used to determine the distance from communication device 100. If communication device 100 is at a distance which does not violate a predetermined limit, communication device 100 can maintain the current transmit power. Otherwise, communication device 100 can redirect the antenna beam 164 to an unobstructed direction or can reduce the transmit power in the same direction.

Figure 4:
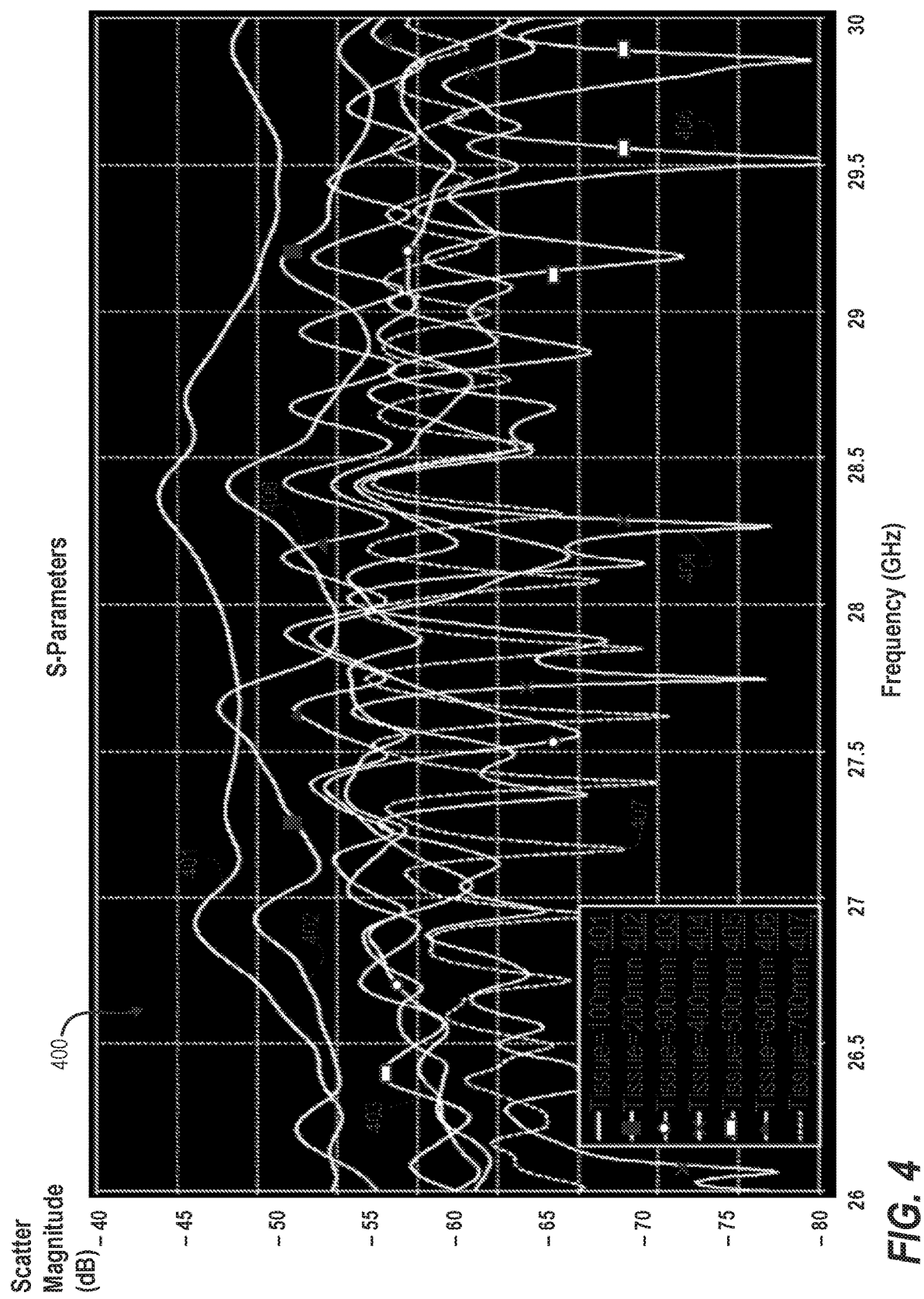
FIG. 4 illustrates a proof-of-concept graphical plot of magnitude traces for back-scattered signals from a human phantom target at different distances.

Communication device 100 is calibrated in advance with data retrieved using a human phantom to populate magnitude LUT 170 (FIG. 1) for back-scattered signals. The human phantom is a life-sized human mannequin that is created from materials that mimic the electromagnetic properties of a real human body and the particular tissues. Computational human phantoms have also been created for use in electromagnetic simulators. Magnitude LUT 170 (FIG. 1) can be later used to detect the presence of a human body. FIG. 4 illustrates a proof-of-concept graphical plot 400 of back scatter magnitude traces from a human phantom target tested at different distances by testing signals having a frequency swept in a range of 27-28 GHz. The test results are plotted and include: (i) 100 mm magnitude trace 401; (ii) 200 mm magnitude trace 402; (iii) 300 mm magnitude trace 403; (iv) 400 mm magnitude trace 404; (v) 500 mm magnitude trace 405; (vi) 600 mm magnitude trace 406; and (vii) 700 mm magnitude trace 407. For a particular distance and frequency, a magnitude threshold can be determined that is indicative of a human target. For example, a corresponding magnitude value for a selected frequency can be taken from each trace 401-407. Values are extrapolated or a line can be fitted to these magnitude values for intermediate distances for which empirical data was not taken. From this line or sequence of magnitude values, an equation or a LUT can respectively be created for determining an appropriate magnitude threshold for each distance. The magnitude threshold can be scaled to be 90%, 95% or 100% of these empirically-derived magnitude values to ensure a high likelihood of a positive detection of a human. Additional frequencies can also be selected as a base for creating magnitude threshold lookups or calculations.

Figure 5:
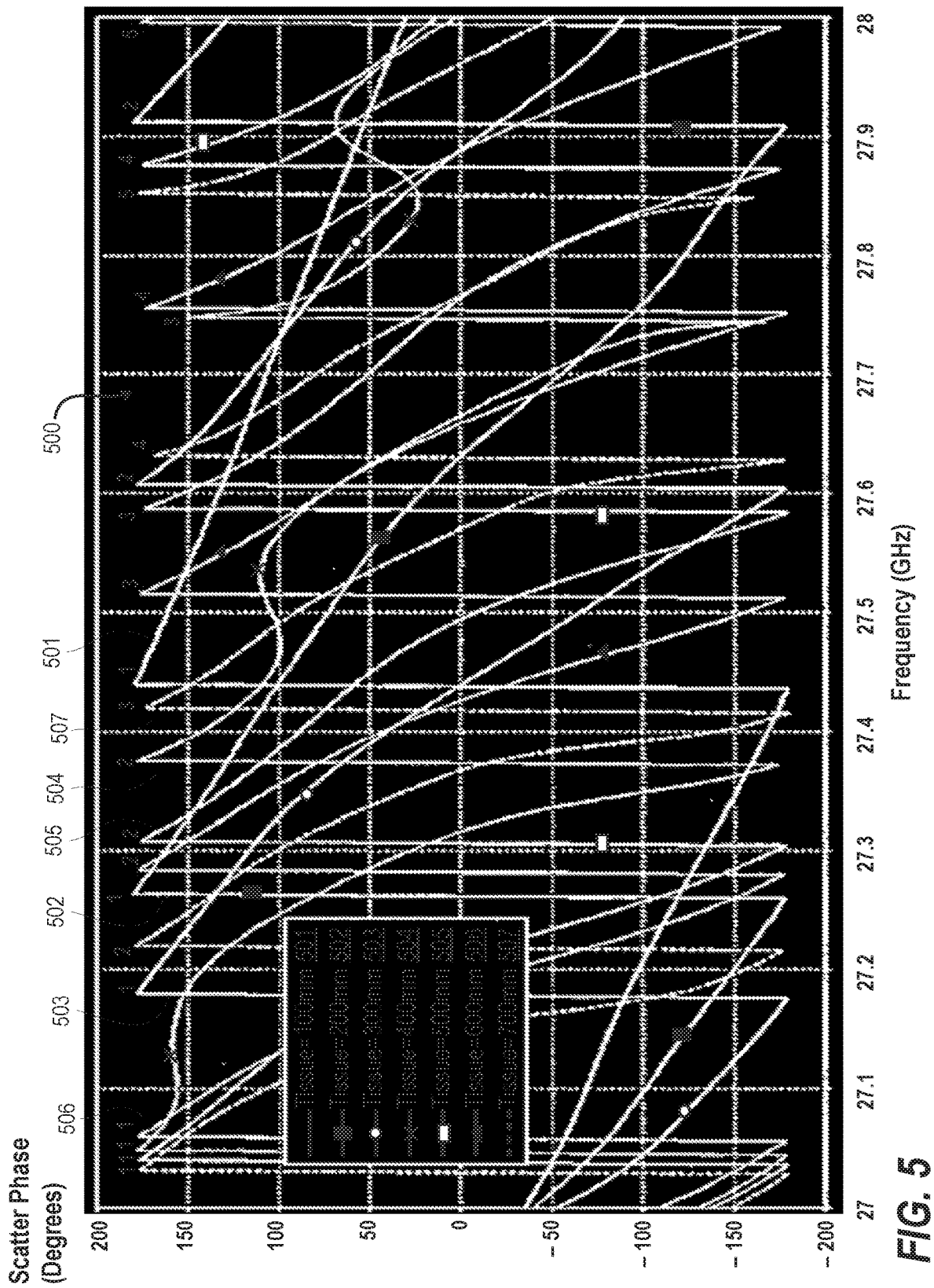
FIG. 5 illustrates a proof-of-concept graphical plot of phase traces for back-scattered signals from a human phantom target at different distances.

Communication device 100 (FIG. 1) is calibrated in advance with a human phantom by placing communication device 100 (FIG. 1) at various separation distances to populate a second look-up table, phase LUT 172 (FIG. 1), for the phase information of the back-scattered signals. FIG. 5 illustrates a proof-of-concept graphical plot 500 of back scatter phase traces that correspond to magnitude traces 401-407 (FIG. 4). The test results are plotted and include: (i)

100 mm magnitude trace 501; (ii) 200 mm magnitude trace 502; (iii) 300 mm magnitude trace 503; (iv) 400 mm magnitude trace 504; (v) 500 mm magnitude trace 505; (vi) 600 mm magnitude trace 506; and (vii) 700 mm magnitude trace 507. For a particular distance and frequency, a magnitude threshold can be determined that is indicative of a human target. The phase information can be used to determine distance to the target using the number of zero crossings over a frequency range. Using a sweeping frequency source, the communication module detects the zero crossings of the phase. In particular, every time the phase detector output is zero (perfectly in phase), the modulation frequency at which this occurred is recorded. The distance corresponds to the round trip time of the lowest frequency which has a zero crossing. Each subsequent zero crossing corresponds to the same increase in frequency. Thus, difference in frequency "Δf" between zero crossings for a number of crossings can be detected to get an accurate measure of the distance from the device and the object that is creating back scattering. The number of zero crossings that occur during the trace indicate distance is provided in TABLE 2:

TABLE 2

| | Distance | | | | | | |
|---|---|---|---|---|---|---|---|
| | 100 mm | 200 mm | 300 mm | 400 mm | 500 mm | 600 mm | 700 mm |
| Number of Zero Crossings | 1 | 2 | 2 | 3 | 4 | 5 | 5 |
| Δf between zero crossing | | 650 MHz | 420 MHz | 300 MHz | 250 MHz | 220 MHz | 200 MHz |

Figure 6:
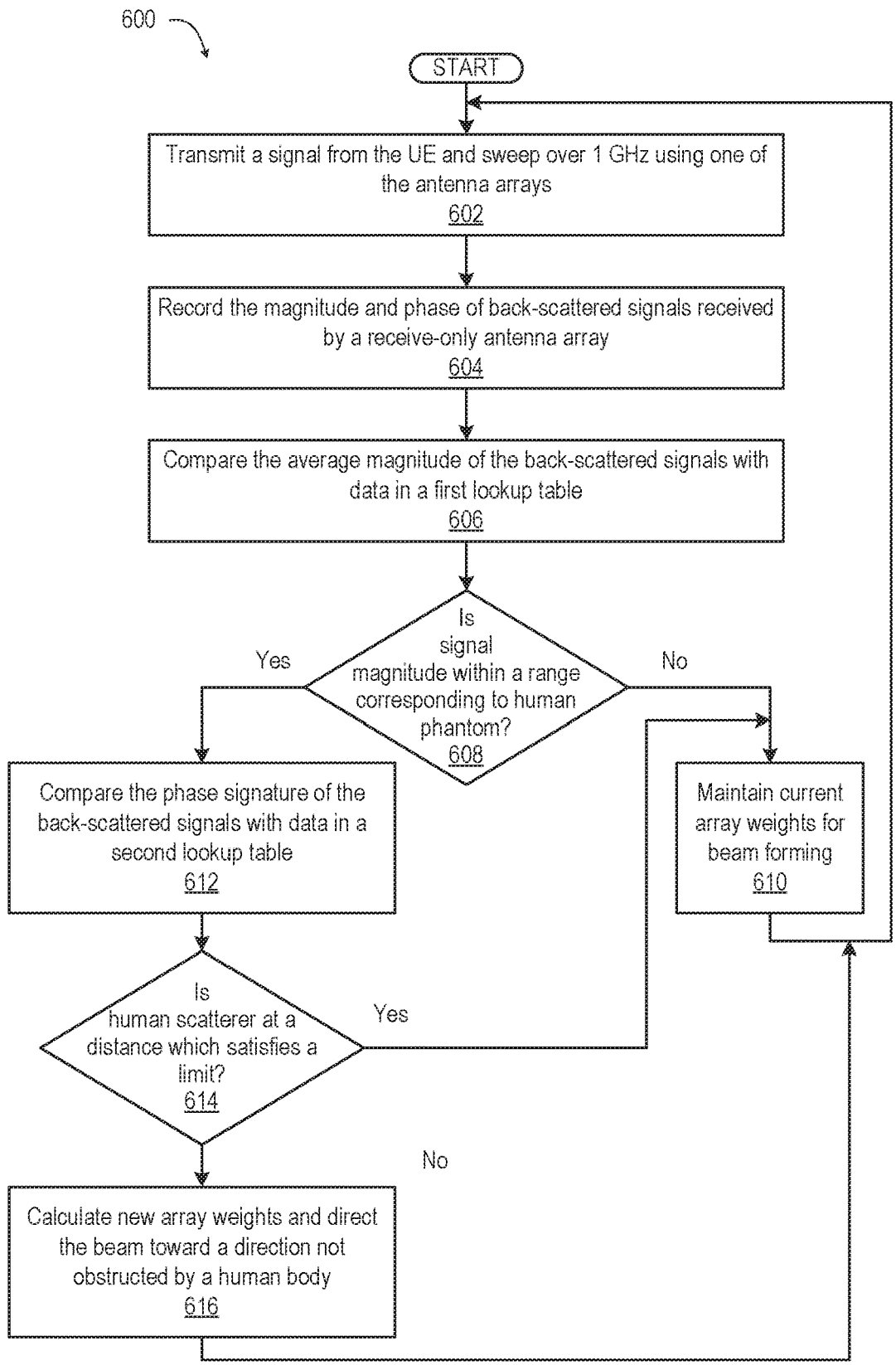
FIG. 6 illustrates a flow chart of a method of altering a transmission beam in response to detecting a body, based on near-field scattering of a millimeter wave (mmWave) transmission, according to one or more embodiments.

FIG. 6 illustrates a method 600 for detecting a near-field obstruction to a user equipment (UE) or communication device 100 (FIG. 1), where the near-field obstruction is conservatively deemed to be a human. In one or more embodiments, method 600 begins with the UE or communication device 100 (FIG. 1) transmitting a signal. The signal is swept over a 1 GHz frequency range using one of the antenna arrays 132 (FIG. 1) of UE (block 602). Method 600 includes recording magnitude and phase of back-scattered signals received by a dedicated receive-only antenna array 132 (FIG. 1) (block 604). A processor 110 (FIG. 1) of the UE or communication device 100 (FIG. 1) compares the average magnitude of the back-scattered signals with data in a first lookup table 170 (FIG. 1) (block 606). A determination is made as to whether the signal magnitude is within a range of magnitudes that correspond to back-scattered signals for/from an empirically tested human phantom (decision block 608). In response to determining that the magnitude is not within the range, method 600 includes maintaining current array weights for beam forming (block 610). Processing returns to block 602 to look again for a near-field obstruction. In response to determining that the magnitude is within the range, indicating a strong likelihood that the object is a human, method 600 includes comparing the phase signature of the back-scattered signals with data in a second lookup table 172 (FIG. 1) (block 612). Based on the phase signature, a determination is made as to whether the human is at a distance which satisfies a pre-identified or pre-set limit, (decision block 614). In response to determining that the distance is greater than or equal to the limit, processing returns to block 610 and then to block 602 to look again for a near-field obstruction without necessarily altering the transmission beam characteristics. In response to determining that the distance is less than the pre-identified or pre-set limit, method 600 includes calculating new antenna array weights and directing the transmission beam toward a direction not obstructed by the human body (block 616). Then processing returns to block 602 to look again for a near-field obstruction.

In one or more embodiments, the assumption that a near-field obstruction is human based upon a magnitude of the back-scattered signal can be deemed a conservative approach. Some of the altering methods can improve QoS within the communication system by avoiding interference with other communication device that receive reflected RF signals from the metal obstruction.

Figure 7:
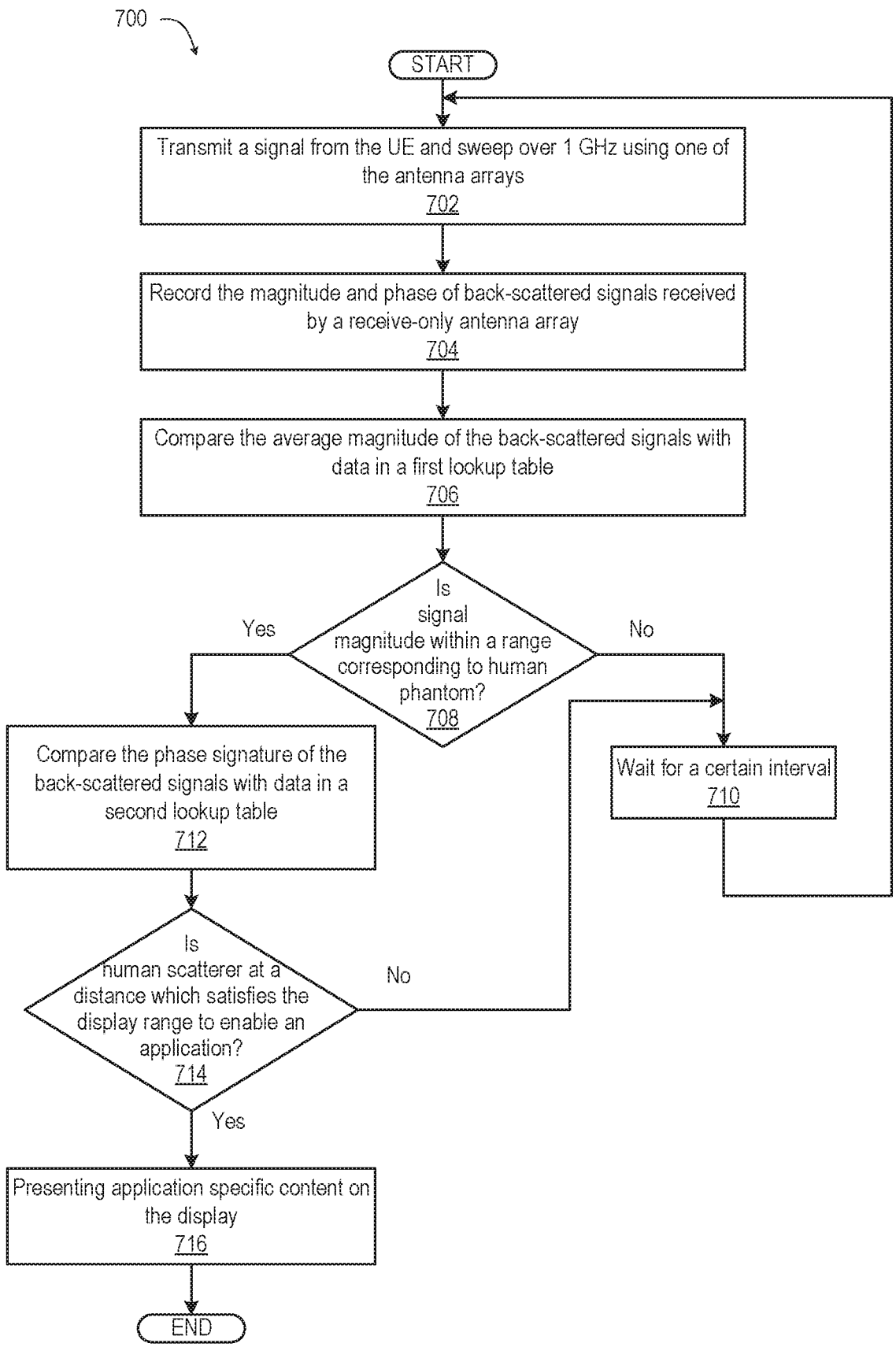
FIG. 7 illustrates a flow chart of a method of triggering an application that is intended to interact with a user in response to detecting a body, based on near-field scattering of a mmWave transmission, according to one or more embodiments.

FIG. 7 illustrates a method 700 for detecting a near-field obstruction to a communication device or UE 100 (FIG. 1), where the near-field obstruction is conservatively deemed to be a human. In one or more embodiments, method 700 begins with the UE or communication device 100 (FIG. 1) transmitting a signal. The signal is swept over a 1 GHz frequency range using of one of the antenna arrays 132 (FIG. 1) of the UE or communication device 100 (FIG. 1) (block 702). Method 700 includes recording magnitude and phase of back-scattered signals received by a receive-only antenna array 132 (FIG. 1) (block 704). A processor 110 (FIG. 1) of the UE or communication device 100 (FIG. 1) compares the average magnitude of the back-scattered signals with data in a first lookup table 170 (FIG. 1) (block 706). A determination is made as to whether the signal magnitude is within a range of magnitudes corresponding to back-scattered signals for/from an empirically tested human phantom (decision block 708). In response to determining that the signal magnitude is not within the range, method 700 includes waiting for a certain interval (block 710). Processing then returns to block 702 to look again for a near-field obstruction. In response to determining that the signal magnitude is within the range that corresponds to a human phantom, method 700 includes comparing the phase signature of the back-scattered signals with data in a second lookup table 172 (FIG. 1) (block 712). Based on the phase signature, a determination is made as to whether the human is within a display range (decision block 714). In response to determining that the distance is greater than the display range, processing returns to block 702 to look again for a near-field obstruction, and a person-in-range enabled (PIRE) application is not enabled. In response to determining that the distance is less than the distance range, method 700 includes enabling the PIRE application (if not already enabled on the device) and presenting application specific content on the display (block 716). Then processing returns to block 702 to look again for a near-field obstruction.

Figure 8A:
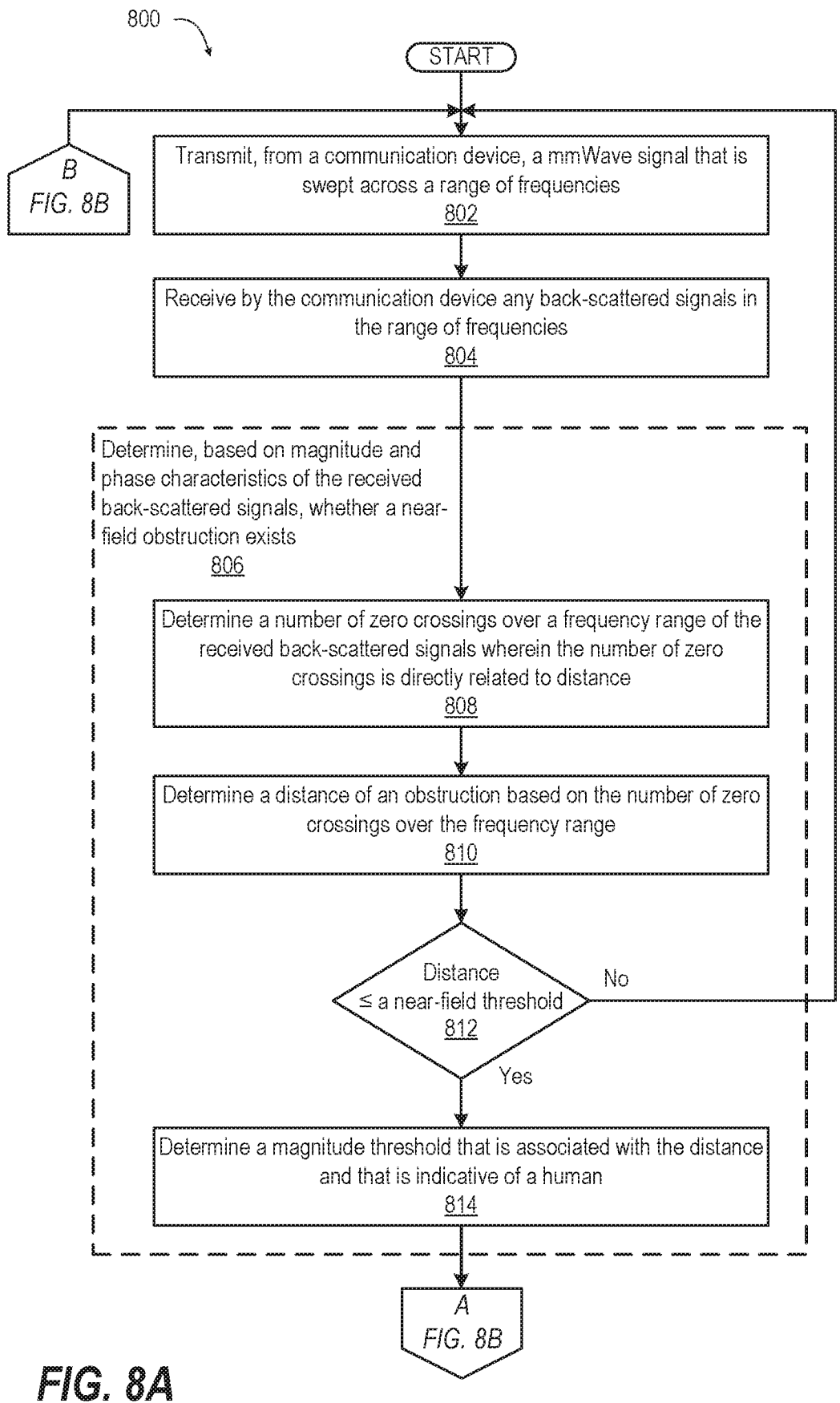
FIGS. 8A-8B illustrates a flow chart of a method by which a communication device detects and responds to a near-field obstruction to the communication device, according to one or more embodiments.
Figure 8B:
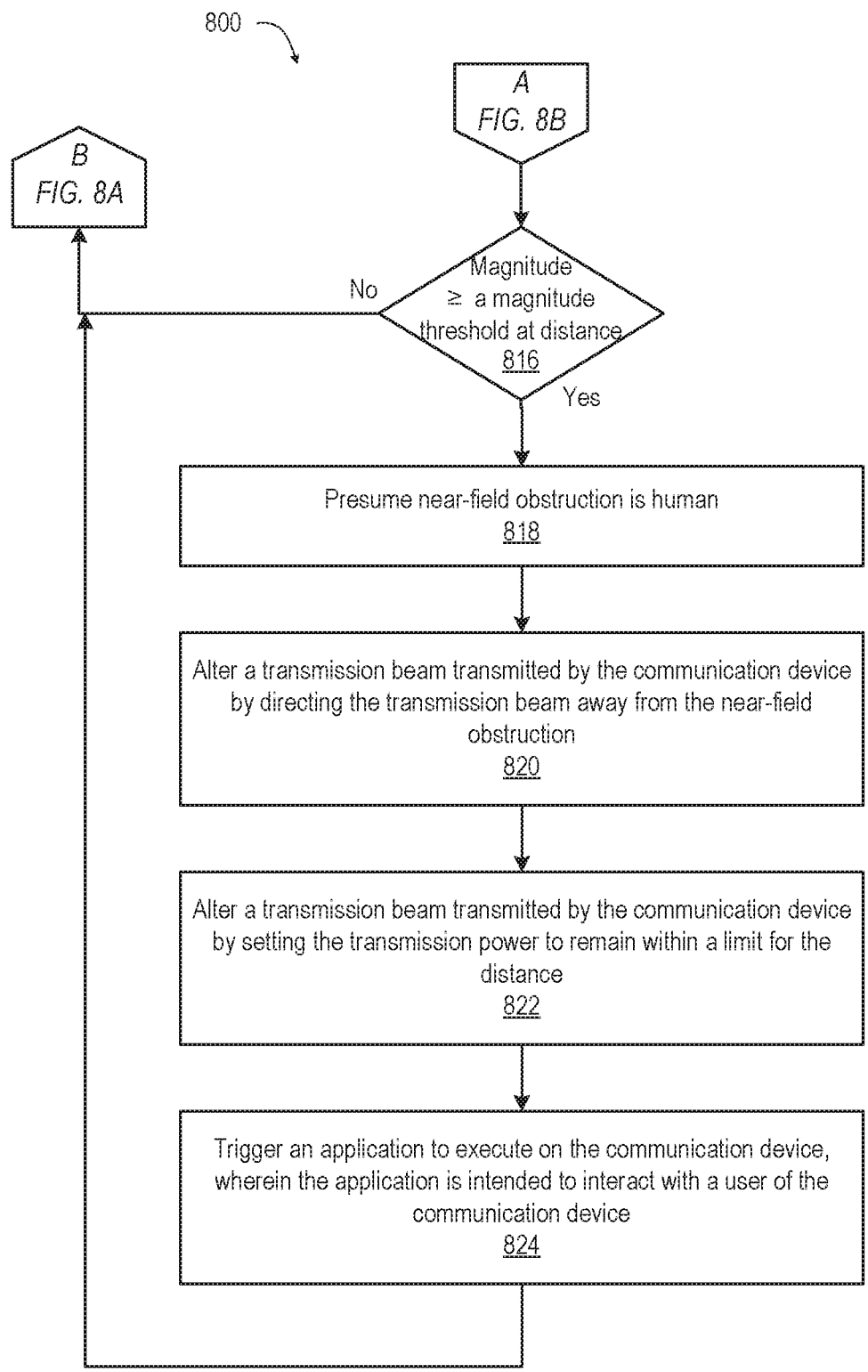

FIG. 8 illustrates a method 800 of detecting and responding to a near-field obstruction to a communication device. In one or more embodiments, method 800 begins transmitting, from a communication device, an mmWave signal that is swept across a range of frequencies (block 802). For example, the range of frequencies can be 1 GHz wide centered on 28 GHz. In one or more embodiments, the mmWave signal can be incorporated into a communication protocol for an uplink sounding reference signal (SRS). An antenna array of the communication device receives any back-scattered signals in the range of frequencies (block 804). Method 800 includes determining, based on magnitude and phase characteristics of the received back-scattered signals, whether a near-field obstruction exists (block 806). In an exemplary embodiment, determining whether a near-field obstruction exists includes determining a number of zero crossings over a frequency range of the received back-scattered signals, where the number of zero crossings is directly related to distance (block 808). Method 800 includes determining a distance of an obstruction based on the number of zero crossings over a frequency range (block 810). A determination is made whether the distance is less than or equal to a near-field threshold (decision block 812). In response to determining that the distance is greater than the near-field threshold, method 800 returns to block 802 to continue monitoring for near-field obstructions. In response to determining that the distance is less than or equal to the near-field threshold, method 800 includes determining a magnitude threshold that is associated with the distance and that is indicative of a human (block 814). A determination is made whether the magnitude of the back-scattered signals is equal to or greater than the magnitude threshold (decision block 816). In response to determining that the magnitude is less than the magnitude threshold, method 800 returns to block 802 to continue monitoring for near-field obstructions. In response to determining that the magnitude is equal to or greater than the magnitude threshold, the near-field obstruction is presumed to be human (block 818).

In one or more embodiments, following the determination in block 818, method 800 includes altering a transmission beam transmitted by the communication device by directing the transmission beam away from the near-field obstruction (block 820). In one or more embodiments, method 800 includes altering the transmission beam transmitted by the communication device by setting the transmission power to remain within a pre-identified or pre-set limit for the distance (block 822). In one or more embodiments, method 800 includes triggering an application to execute on the communication device, wherein the application is intended to interact with a user of the communication device (block 824). Then method 800 returns to block 802 to continue scanning for near-field obstructions.

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   transmitting a signal from a communication device that is swept across a range of frequencies;
   receiving by the communication device any back-scattered signals in the range of frequencies;
   determining based on the received back-scattered signals whether a near-field obstruction exists; and in response to determining that a near-field obstruction exists based on the received back-scatter signals, performing one or more operations on the communication device.

2. The method of claim 1, wherein performing one or more operations comprises altering a transmission beam transmitted by the communication device.

3. The method of claim 1, wherein performing one or more operations comprises triggering an application to execute on the communication device, the application intended to interact with a user of the communication device.

4. The method of claim 1, wherein determining that a near-field obstruction exists comprises determining that the near-field obstruction exists based on at least one of magnitude and phase characteristics of the received back-scattered signals.

5. The method of claim 1, wherein determining that a near-field obstruction exists comprises:
  determining a number of zero crossings over a frequency range of the received back-scattered signals wherein the number of zero crossings is directly related to distance;
  determining a distance of an obstruction based on the number of zero crossings over a frequency range;
  determining whether the distance is less than or equal to a near-field threshold; and
  determining that the near-field obstruction exists in response to determining that the distance is equal to or less than the near-field threshold.

6. The method of claim 1, wherein determining that a near-field obstruction exists comprises:
  determining a distance to the received back-scattered signals based on the phase characteristic;
  determining whether the distance is less than or equal to a distance threshold indicative of a near-field obstruction;
  associating with the distance a magnitude threshold that is indicative of a human;
  determining whether the magnitude of the back-scattered signals is equal to or greater than the magnitude threshold;
  in response to the magnitude being equal to or greater than the magnitude threshold and the distance being less than or equal to the distance threshold, determining that the received back-scattered signals is a human in the near field; and
performing the selected one of triggering the application in response to determining that the near-field obstruction is human.

7. The method of claim 2, wherein altering the transmission beam transmitted by the communication device comprises one of:
  (i) directing the transmission beam away from the near-field obstruction; and
  (ii) determining a distance to the near-field obstruction based on the phase characteristics; and setting the transmission power to remain within a limit for the distance.

8. A communication device comprising:
an antenna array;
a memory containing a near-field detection application;
a communication module communicatively coupled to the antenna array to transmit and to receive signals; and
a processor subsystem in communication with the communication module and which executes the near-field detection application, which causes the processor subsystem to:
  transmit a signal from a communication device that is swept across a range of frequencies;
  receive by the communication device any back-scattered signals in the range of frequencies;
  determine based on the received back-scattered signals whether a near-field obstruction exists; and
  in response to determining that a near-field obstruction exists in response to determining that a near-field obstruction exists based on the received back-scatter signals, perform one or more operations on the communication device.

9. The communication device of claim 8, wherein the one or more operations comprise altering a transmission beam transmitted by the communication device.

10. The communication device of claim 9, wherein to alter the transmission beam, the processor subsystem causes the communication module to direct the transmission beam by the antenna array away from the near-field obstruction.

11. The communication device of claim 9, wherein to alter the transmission beam the processor subsystem causes the communication module to:
  determine a distance to the near-field obstruction based on the phase characteristics; and
  set the transmission power to remain within a limit for the distance.

12. The communication device of claim 8, wherein the one or more operations comprise triggering an application to execute on the communication device, the application intended to interact with a user of the communication device.

13. There communication device of claim 8, wherein to determine that a near-field obstruction exists, the processor subsystem determines that the near-field obstruction exists based on at least one of magnitude and phase characteristics of the received back-scattered signals.

14. The communication device of claim 8, wherein to determine that a near-field obstruction exists, the processor subsystem:
  determines a number of zero crossings over a frequency range of the received back-scattered signals, wherein the number of zero crossings is directly related to distance;
  determines a distance of an obstruction based on the number of zero crossings over a frequency range;
  determines whether the distance is less than or equal to a near-field threshold; and
  determines that the near-field obstruction exists in response to determining that the distance is equal to or less than the near-field threshold.

15. The communication device of claim 8, wherein the processor subsystem:
  determines a distance to the received back-scattered signals based on phase characteristics of the received back-scattered signals;
  determines whether the distance is less than or equal to a distance threshold indicative of a near-field obstruction;
  associates with the distance a magnitude threshold that is indicative of a human;
  determining whether the magnitude of the back-scattered signals is equal to or greater than the magnitude threshold;
  in response to the magnitude being equal to or greater than the magnitude threshold and the distance being less than or equal to the distance threshold, determines that the received back-scattered signals is a human in the near field; and performs the selected one of triggering the application in response to determining that the near-field obstruction is human.

16. A computer program product comprising:

a computer readable storage device; and program code on the computer readable storage device that when executed by a processor associated with a communication device, the program code enables the communication device to provide the functionality of:

transmitting a signal from a communication device that is swept across a range of frequencies;

receiving by the communication device any back-scattered signals in the range of frequencies;

determining based on a magnitude of the received back-scattered signals whether a near-field obstruction exists; and in response to determining that a near-field obstruction exists based on the received back-scattered signals, performing one or more operations on the communication device.

17. The computer program product of claim 16, wherein the one or more operations comprises altering a transmission beam transmitted by the communication device, the program code for altering the transmission beam comprising program code for at least one of (i) directing the transmission beam away from the near-field obstruction; and (ii) determining a distance to the near-field obstruction based on the phase characteristics and setting the transmission power to remain within a limit for the distance.

18. The computer program product of claim 16, wherein the program code for determining that a near-field obstruction exists comprises program code for:

determining a number of zero crossings over a frequency range of the received back-scattered signals wherein the number of zero crossings is directly related to distance;

determining a distance of an obstruction based on the number of zero crossings over a frequency range;

determining whether the distance is less than or equal to a near-field threshold; and determining that the near-field obstruction exists in response to determining that the distance is equal to or less than the near-field threshold.

19. The computer program product of claim 16, wherein the program code for determining that a near-field obstruction exists comprises program code for:

determining a distance to the received back-scattered signals based on phase characteristics of the received back-scattered signals;

determining whether the distance is less than or equal to a distance threshold indicative of a near-field obstruction;

associating with the distance a magnitude threshold that is indicative of a human;

determining whether the magnitude of the back-scattered signals is equal to or greater than the magnitude threshold;

in response to the magnitude being equal to or greater than the magnitude threshold and the distance being less than or equal to the distance threshold, determining that the received back-scattered signals is a human in the near field; and triggering an application in response to determining that the near-field obstruction is human.

20. The computer program product of claim 16, wherein:

the program code for performing one or more operations comprises code for triggering an application to execute on the communication device, the application intended to interact with a user of the communication device; and the program code for determining that a near-field obstruction exists comprises code for determining that the near-field obstruction exists based on the magnitude and phase characteristics of the received back-scattered signals.

* * * * *